Patented Oct. 23, 1951

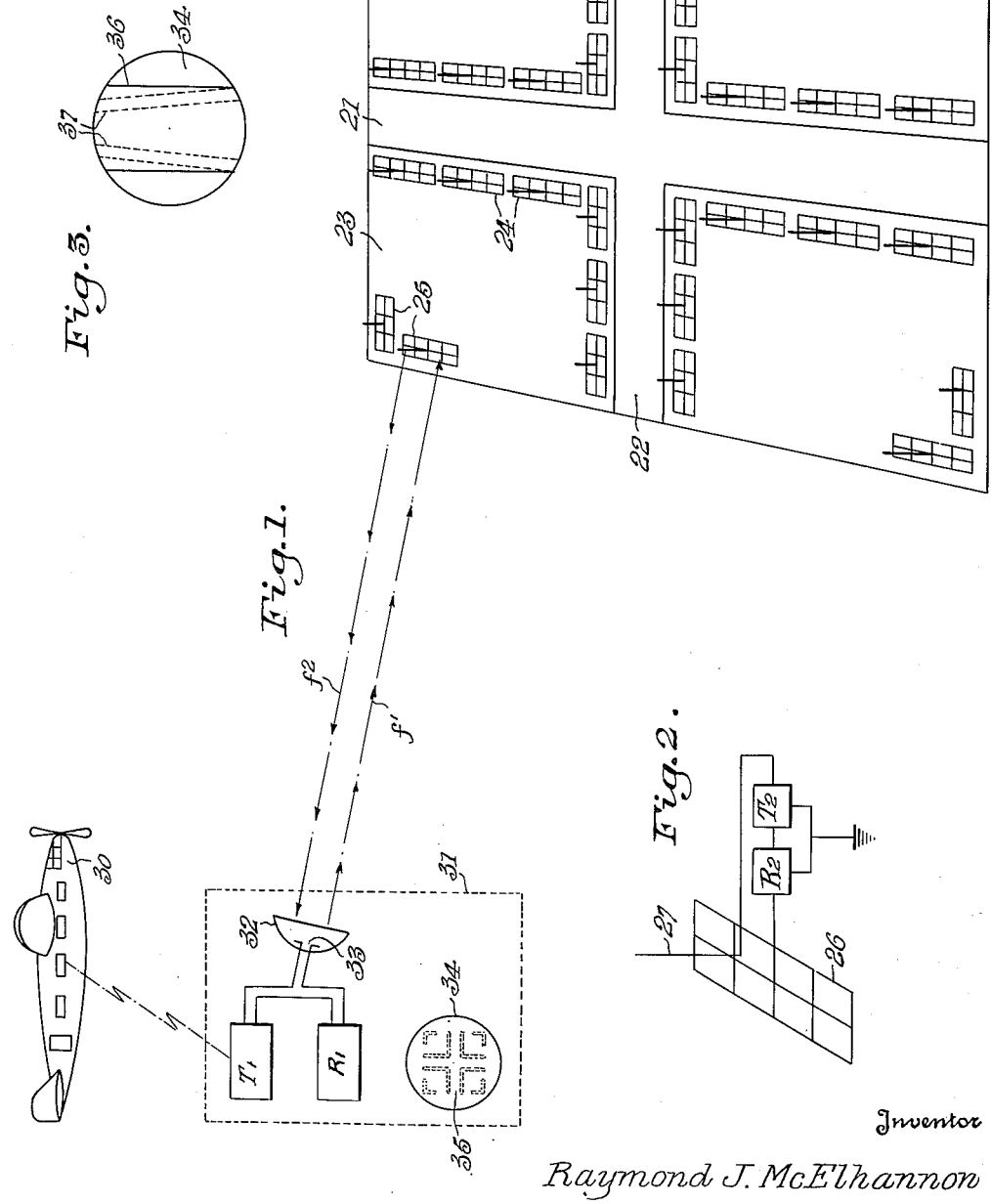

2,572,043

UNITED STATES PATENT OFFICE 2,572,043

BLIND LANDING SYSTEM

Raymond J. McElhannon, Flushing, N. Y., assignor to the United States of America as represented by the Secretary of War Original application May 14, 1943, Serial No. 486,944. Divided and this application January 6, 1950, Serial No. 137,231

1 Claim. (Cl. 343—11)

(Granted under the act of March 3, 1883, as amended April 30, 1928; 370 O. G. 757)

The invention described herein may be manufactured and used by or for the Government for governmental purposes without the payment of any royalty thereon.

This application is a division of my co-pending application Serial No. 486,944, filed May 14, 1943, now Patent No. 2,502,974, dated April 4, 1950.

This invention pertains to improvements in method and apparatus for blind landing airplanes through fog and related light-impenetrable overcast conditions, such as obscures the ground.

The various schemes heretofore in vogue for blind landing planes have proved defective or insufficient in respects and for reasons so well understood as to require no recapitulation.

The present invention embodies principles of construction and operation which are radically new insofar as is known to me.

In accordance with the principles of the invention as broadly stated, the plane is provided with a radar system including a short wave transmitter, receiver and associated cathode tube, and deflectable, directive aerial, said system being constructed and arranged to transmit short radio waves to successive portions of an area to be scanned, while meantime the beam of the cathode tube scans the screen thereof in coincidence with the scanning movement of the aerial. On the landing field, the runways, and optionally also the outlines of the field, are defined by metal members adapted during incidence thereon of the short waves transmitted from the plane radar, to cause short radio waves to be radiated therefrom to the plane radar aerial, whereby an image is produced on the cathode screen corresponding to the dispositions of said metal members defining said runways, and optionally also the outlines of said field.

In accordance with this modification of the invention I employ a plane radar arranged to transmit on one frequency and to receive on a different frequency. In conjunction therewith the landing field is equipped along the runways, and optionally also along the boundaries thereof, with a succession of combined receiver and transmitter units and associated antennas, the receiver units responding to the wavelength received from the plane radar to "trigger" the associated transmitter to retransmit at the different wavelength to which the radar receiver responds, this retransmission occurring, for any given combined receiver and transmitter ground unit only so long as the radio beam from the plane is incident thereon. In this way, during scanning of the field by the plane radar, first one ground unit and then another on the landing field is energized in such a pattern as to produce on the cathode screen of the plane radar an image in the form of a series of light spots, corresponding to the disposition of these ground units along the runways and boundaries of the landing field. These ground units can be so adjusted as to power output as to produce a clear and distinct image at all times on the radar screen. And since transmission and reception at the plane radar, occurs on different frequencies or wavelengths, there is no interference between them, and a clean image is retained on the radar screen until the plane lands.

Although pulse type transmission and reception can be employed for the radar with this modification, it is not necessary to do so. The plane radar can be, and preferably is, of the continuous wave type which transmits continuously and without interruption during scanning. This reduces the power level required for transmission, and simplifies the construction in that, among other things, no device is required for alternately cutting off the transmitter and activating the receiver, such as is necessary for pulse type transmission.

Referring now to the drawings:

Figure 1 is a diagrammatic showing of this modification wherein the plane radar is of the continuous wave type transmitting and receiving on different frequencies, the landing field being equipped along the runways and landing field boundaries with combined receiver and transmitter units as above mentioned.

Figure 2 is an enlarged schematic showing of one of the combined receiver and transmitter or "ground units" employed on the landing field in this modification.

Figure 3 is a detail of the cathode tube screen with indicia marked thereon to illustrate their utility in landing.

Referring to Figure 1, the runways, 21, 22, of an airfield 23, are lined, at spaced intervals, with a succession of combined receiving and transmitting ground units, as at 24 in Figure 1, and shown more in detail in Figure 2. Additional such ground units may be provided at the boundaries of the field, as at 25, to map out its contour.

As shown more particularly in Figure 2, each ground unit includes a receiving antenna 26, arranged horizontally above the ground in the form of an elongated wire network or mesh as shown. The receiving antenna is connected to the input of a receiving unit R-2, tuned to respond to a short wave frequency F-1. The output of receiver R-2 is connected to the input of an associated transmitter T-2, in such manner as to "trigger" the transmitter to transmit from an associated vertical aerial 27, a different frequency F-2, from that to which the receiver R-2 responds. The vertical type aerial is employed for the transmitter T-2 in order that radiation therefrom will occur with equal intensity in all directions, so that signals therefrom can be picked up by the radar of an approaching plane irrespective of its direction of approach.

An airplane 30, approaching the field 23, is equipped with a radar system 31, having the usual "spinner" 32 adapted to scan the entire area of the field progressively, as for example, radial or conical scanning. Connected to the dipole aerial 33, of the "spinner" is a continuous wave transmitter T-1, arranged to transmit continuously on the frequency F-1 to which the air-field receivers R-2 are responsive. As the spinner sweeps across successive areas of the field, first one receiving antenna 26, Fig. 2, and then another lining the runways will be energized by the transmitted waves of frequency F-1. During such energization, the receiver R-2, interposed in such aerial will "trigger" the associated transmitter T-2, causing it to radiate the different frequency, F-2, from the associated vertical antenna 27. The waves of frequency F-2 so transmitted from the vertical antenna will be radiated uniformly in all directions and hence be picked up in part by the spinner of the radar system on the plane so long as the spinner is directed toward that particular antenna. Connected to the dipole aerial 33, of the spinner is a radio receiver R-1, responsive to this frequency F-2. This receiver is connected to a cathode ray tube 34, having a sweep corresponding to the scanning of the spinner.

Accordingly, as the spinner sweeps across successive portions of the air-field, and thus transmits frequency F-1 to first one air-field receiving antenna and then to another, the associated vertical antennas will radiate at a frequency F-2, back to the spinner so long as the spinner is directed to any particular air-field ground unit 24 or 25. These waves so transmitted from successive air-field vertical antennas will produce a series of light spots on the cathode screen, which spots will be arranged in conformity with an image 35 of the pattern of the air-field antennas along the runways of the field, as well as along the boundaries thereof if desired.

In this way, the pilot has before him on the cathode screen, in the form of a succession of light spots, a continuous image of the outline of the air-field and runways, so that he can bring the plane to the ground safely through overcast, i. e. fog, rain, sleet, etc., or could land at night without lights.

The image is not lost or "blanked out" in this case as the plane approaches the field, due to the fact that the radar scanning system is transmitting on a frequency F-1, while the cathode screen image producing waves thereof is received on a different frequency, F-2. Accordingly, the waves transmitted from the radar unit do not interfere with those received from the air-field ground units, even though the same spinner 32, and associated dipole antenna 33, are used for transmission and reception thereof.

A strong image will be produced at all times on the cathode screen by reason of the above and the further fact that the image is not based on reflected waves but on waves generated and transmitted from the air-field antennas, the intensity of which can be made as strong or as weak as desired. An additional advantage of this modification is that it avoids the necessity of using pulse transmission and accompanying alternate paralyzing and activating of the receiving unit, the objections to which are now well understood.

The lengths of the receiving antennas 26, Figure 2, are adjusted in conformity with the resolving power of the radar system to produce a coarse or fine image 35, on the cathode screen of the radar, depending on its degree of resolution. By virtue of this feature, radar systems now in current use, such as those operating on a wave length of 10 centimeters, could be immediately applied successfully to the blind landing of airplanes with the system proposed herein; although radar operating on wavelengths of 1 to 3 centimeters is preferred.

The cathode screen image is not lost or "blanked out" as the plane approaches the field, but remains and becomes increasingly enlarged as the plane approaches a runway and is brought directly to ground. With a little practice and by gauging the increase in size of the image, the pilot will know about when the wheels will be expected to touch. In fact, appropriate indicia can be marked on the cathode screen to indicate the width of the image at which landing will occur, and the pilot would merely line up the light spots of the image with these indicia. Referring to Figure 3, such indicia markings are shown at 36, 37 on the cathode screen 34. At the instant of landing the runway image would be about as shown at 37.

The present invention is not limited in its ability to locating through overcast, landing fields and the runways thereof, but the principles enumerated herein may be extended to mapping out the entire courses of airlines, especially commercial airlines, between distant points. Thus at intervals along the line of flight of a commercial airline, metal members may be arranged in characteristic design on the ground, to be picked up on the plane radar and thus advise the pilot as to his exact location at any given instant.

Preferably the line of flight may be mapped out by mounting along the course on the ground, a series of combined receiving and transmitting ground units like that of Figure 2. With this latter arrangement, the plane radar will periodically pick up definite signals from these ground units as the plane flies its course, these ground units thereby functioning as radio beacons to guide the pilot along his course. Accordingly, even though the plane is flying absolutely blind, it will be guided accurately along its course to the landing field and to a safe landing thereat. Danger spots along the course, such as high mountains, can be especially marked out with a series of metal members or beacons as aforesaid, to be automatically picked up on the plane radar and thus warn the pilot well in advance as to his position of flight in relation thereto.

I claim:

A system for blind landing airplanes, comprising: an airplane equipped with a radar system of the continuous wave type including a short wave transmitter, a receiver and an associated cathode ray tube, a variably deflectable directive aerial, for continuously transmitting said short waves to successive portions of an area to be scanned, and means for causing the cathode ray beam of said tube to traverse the screen thereof in coincidence with the scanning movements of said aerial; a landing field provided with runways; and a plurality of combined short wave receiving and retransmitting means defining said runways, said means responding individually to said short waves incident thereon from said aerial for retransmitting short radio waves of a different wave length to said aerial during such incidence, thereby to produce on the screen of said cathode ray tube an image corresponding to the dispositions of said means defining said runways.

RAYMOND J. McELHANNON.

REFERENCES CITED

The following references are of record in the file of this patent:

UNITED STATES PATENTS

| Number | Name | Date |
|---|---|---|
| 2,204,628 | Sorensen | June 18, 1940 |
| 2,279,246 | Podliasky | Apr. 7, 1942 |
| 2,426,218 | Hopgood | Aug. 26, 1947 |
| 2,502,974 | McElhannon | Apr. 4, 1950 |
| 2,536,728 | De Saint-Exupery | Jan. 2, 1951 |